Dec. 27, 1960 S. L. INGERSOLL 2,966,379
SHOVELS
Filed Jan. 3, 1956
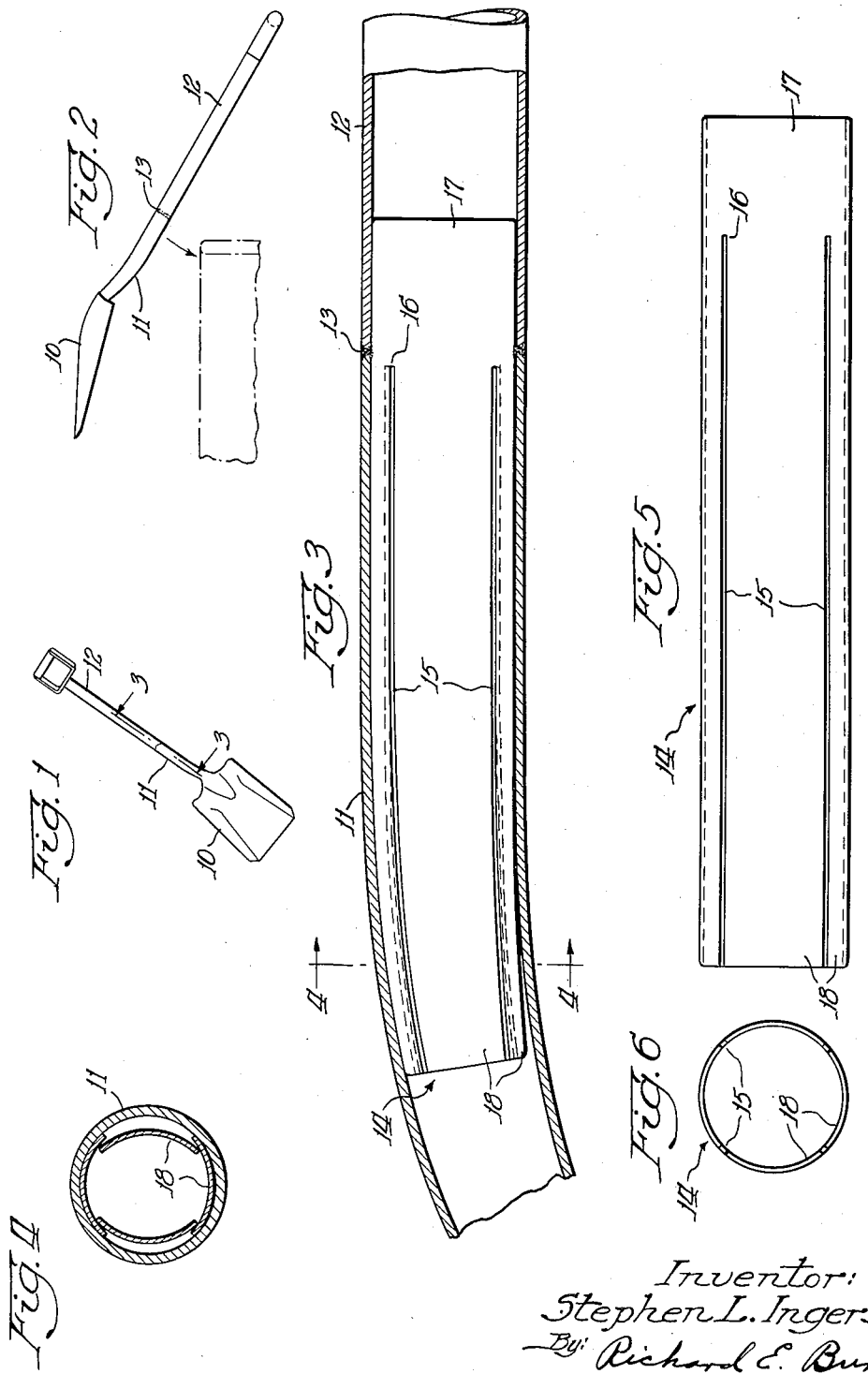
Inventor:
Stephen L. Ingersoll
By: Richard E. Burn
Atty

United States Patent Office 2,966,379
Patented Dec. 27, 1960

2,966,379

SHOVELS

Stephen L. Ingersoll, Chicago, Ill., assignor to Borg-Warner Corporation, a corporation of Illinois Filed Jan. 3, 1956, Ser. No. 557,028

5 Claims. (Cl. 294—49)

This invention relates to shovels, rakes, hoes and the like and other tools having handles which are long, and of comparatively small diameter but which must withstand severe stresses and strains. In certain industries particularly those concerned with the handling of food it is necessary to supply shovels and other material handling tools which are so constructed that the entire tool may be sterilized in steam or boiling water. One of the requirements for this type of tool is that it must have no crevices in which contaminated food or bacteria carrying material may gather. Another requirement is that the shovel must withstand high temperatures for sterilizing and yet be light enough to be easily handled.

It is a principal object of this invention to provide a stainless steel shovel or material handling tool which is light in weight and easily handled but which is strengthened at crucial points so that it can withstand severe stress under use without damage.

It is a further object to provide such a shovel which incorporates a reinforcing member in cooperative relationship with the socket portion of the shovel and its hollow metal handle to reduce the possibility of failure of the shovel under stress such as when it is struck against a container in order to empty the contents from the shovel blade.

It is a still further object of this invention to provide a shovel which is inexpensive to manufacture and simple to assemble.

Other objects and advantages of the invention will be apparent from the following description, the accompanying drawing and the appended claims.

In the drawing:

Fig. 1 is a perspective view of a shovel constructed in accordance with the present invention;

Fig. 2 is an elevational view of said shovel in use, showing it about to be struck against the wall of a container;

Fig. 3 is an elevational view partially in cross-section taken on the line 3—3 of Fig. 1;

Fig. 4 is a cross-sectional view taken on the line 4—4 of Fig. 3;

Fig. 5 is an elevational view of a tubular reinforcing sleeve; and

Fig. 6 is an elevational view taken from one end of Fig. 5.

A preferred embodiment of the invention is shown as a shovel in the drawing but it will be understood that the invention is useful in other tools having a similar socket and handle construction as the shovel shown. Referring to the preferred embodiment shown in the drawing a shovel is provided with a blade portion 10 of suitable shape for the particular use desired of said shovel; the blade having a tubular socket portion 11 formed integrally therewith or welded thereto as may be desired and curved in the manner shown to provide the desired lift to the shovel blade. The socket portion is tapered from its open end to where it joins the top of the blade so that its internal diameter decreases as it approaches the blade.

A tubular metal handle 12 abuts the open end of socket portion 11 and is welded thereto as is shown in the drawing. The outside diameter of the end of the socket portion and that of the handle are the same so that a smooth surface is presented when the weld metal 13 is ground flush with the outer surfaces.

A tubular reinforcing sleeve indicated generally at 14 is provided for reinforcing the socket portion and the joint between the socket portion and the handle. The reinforcing sleeve 14 is preferably formed from one piece of stainless steel of uniform diameter but may be manufactured of other material having spring-like characteristics. A plurality of narrow slits 15 are cut axially in the sleeve extending from one end thereof and terminating at a point 16 short of the opposite end of said sleeve leaving an annular portion 17 with a plurality of arcuate finger-like members 18 extending therefrom. The external diameter of the reinforcing sleeve 14 is approximately the same as the internal diameter of the handle 12 and the open end of the socket 11 as is shown in Fig. 3. In assembling the shovel the sleeve 14 is driven into the socket 11 until the ends 16 of the slits 15 are adjacent the end of the socket 11. Since the socket 11 is tapered the finger-like members 18 formed in the sleeve 14 are forced together as shown in Fig. 4 so that certain of members 18 are compressed inside of other finger-like members. Thus a very tight fitting reinforcing sleeve is provided which supports the socket and the handle.

While in the preferred embodiment I have disclosed the sleeve as having four slits 15 and four finger-like members 18 and have found that this construction affords a particularly effective structure both for manufacturing and assembling and particularly in the resulting reinforcment provided, I include as coming within the broader scope of my invention, a greater or lesser number of slits 15 and members 18 provided that there are sufficient finger-like members so that at least one member will be compressed inside of other members in order to provide for a tight fit and a wedging reinforcing action in the socket.

The shovel construction with the reinforcing sleeve provides an increase in strength of the socket portion 11, which is the place on the shovel usually struck on the wall of a container in order to empty the load. Since it is essential in order to provide an acceptable shovel that the handle and the socket be constructed of light weight materials the socket portion has been a source of considerable failure in the past due to striking the hollow socket portion on the sides of containers.

The tubular reinforcing sleeve 14 adds considerable strength at a critical position so that the shovel described is made much more resistant to breakage than previous hollow handled shovels.

It will likewise be apparent that the present construction provides for readily assembling the handle on the socket portion since the inserted reinforcing sleeve 14 aligns the socket and the handle in position while the weld is made. A suitable material which has been successfully used for the handle and the socket portion comprises, for example, 18 gauge stainless steel.

The tubular reinforcing sleeve may be formed of cold rolled high carbon steel. It need not be stainless steel since it is entirely enclosed in the stainless steel handle and socket portion of the shovel and the weld is formed with stainless steel rod.

While the form of shovel herein described constitutes a preferred embodiment of the invention, it is to be understood that the invention is not restricted to this precise form and that changes may be made therein without

What is claimed is:

1. A shovel comprising a blade having a tapered socket portion thereon, the smallest cross-section of the taper being adjacent the blade, a tubular handle having one end secured to said socket portion so as to form a continuous seamless tube and an internal tubular reinforcing sleeve extending into both said handle and said socket and comprised of a material having spring characteristics, said sleeve having a plurality of axial slits extending from one end of said sleeve and terminating short of the opposite end to provide an annular portion from which flexible finger-like members extend into said socket portion with the finger-like members forced together in over-lapping relationship by the socket taper with at least one of said members compressed inwardly between two adjacent members so as to act as a wedge holding said sleeve tightly in said socket portion.

2. A shovel comprising a blade having a tapered socket portion thereon, the smallest cross-section of the taper being adjacent the blade, a handle having one end welded to said socket portion so as to form a continuous seamless tube and an internal tubular reinforcing sleeve extending into both said handle and said socket and comprised of a material having spring characteristics, said sleeve having four axial slits extending from one end of said sleeve and terminating short of the opposite end to provide an annular portion from which four arcuate flexible finger-like members extend into said socket portion with the finger-like members forced together radially inwardly in over-lapping relationship by the socket taper, said over-lapping increasing from the open end of said socket portion toward the blade end of said socket portion, compressing at least one of said members inwardly between adjacent others of said members so as to act as a wedge with said annular portion positioned inside of said handle.

3. A shovel or the like comprising a blade having a handle receiving portion thereon with a tapered socket, the smallest cross-section of the taper being adjacent the blade, a handle having one end secured to said handle receiving portion so as to form a continuous seamless tube and an internal tubular reinforcing member extending into both said handle and said socket and comprised of spring like material, said reinforcing member having a plurality of axial slits extending from one end for a portion of its length leaving a continuous annular portion with arcuate, flexible finger-like members extending therefrom and into said socket, said reinforcing member normally having a uniform diameter commensurate with the largest diameter of said tapered socket to engage the socket interiorly and being positioned in said socket so that the finger-like members are forced together by the decreasing diameter of said socket with at least one member compressed inwardly between two adjacent members so as to form a wedge-like support for said handle-receiving portion.

4. A metal shovel particularly adapted for handling foods and the like, which comprises a blade with a socket extending therefrom having a tapered cross-section with the smallest cross-section of the taper being adjacent the blade and largest cross-section thereof appearing as an open terminal, a tubular reinforcing sleeve composed of material having spring characteristics inserted into said socket, and having a plurality of axially extending slits, each of said slits extending from one end of said sleeve and terminating short of the opposite end to provide a continuous annular portion from which flexible finger-like members extend axially into said socket, some of said fingers being compressed radially inwardly between adjacent fingers into an overlapping relationship so as to form wedge-like members, said finger-like members extending into said socket portion and said annular portion protruding from the open terminal and a tubular shovel handle being fitted around the said annular portion and into abutting relation with said terminal and welded thereto so as to form a continuous seamless tube.

5. A shovel comprising a blade having a socket portion thereon with a taper formed in said socket portion, the smallest cross-section of the taper being adjacent the blade, a handle, a tubular reinforcing sleeve one end thereof being inserted into said socket portion and the other end thereof being connected to said handle by insertion into said handle, said sleeve comprising a plurality of flexible finger-like members separated by longitudinal slits, at least one member being compressed inwardly between two adjacent members.

References Cited in the file of this patent

UNITED STATES PATENTS

| 622,747 | Wood | Apr. 11, 1899 |
| 697,828 | Fowler | Apr. 15, 1902 |
| 1,291,505 | Hecox | Jan. 14, 1919 |

FOREIGN PATENTS

| 15,842 of 1907 | Great Britain | Dec. 31, 1907 |
| 201,827 | Great Britain | Aug. 9, 1923 |